US012334666B2

(12) United States Patent
Mamiya

(10) Patent No.: US 12,334,666 B2
(45) Date of Patent: Jun. 17, 2025

(54) CONNECTOR

(71) Applicant: SUMITOMO WIRING SYSTEMS, LTD., Mie (JP)

(72) Inventor: Yuma Mamiya, Mie (JP)

(73) Assignee: SUMITOMO WIRING SYSTEMS, LTD., Mie (JP)

(*) Notice: Subject to any disclaimer, the term of this patent is extended or adjusted under 35 U.S.C. 154(b) by 264 days.

(21) Appl. No.: 18/029,046

(22) PCT Filed: Jul. 30, 2021

(86) PCT No.: PCT/JP2021/028321
§ 371 (c)(1),
(2) Date: Mar. 28, 2023

(87) PCT Pub. No.: WO2022/079978
PCT Pub. Date: Apr. 21, 2022

(65) Prior Publication Data

US 2023/0369798 A1 Nov. 16, 2023

(30) Foreign Application Priority Data

Oct. 14, 2020 (JP) ................................. 2020-173035

(51) Int. Cl.
*H01R 13/436* (2006.01)

(52) U.S. Cl.
CPC ................................ *H01R 13/4365* (2013.01)

(58) Field of Classification Search
CPC ........................ H01R 13/4364; H01R 13/4365
See application file for complete search history.

(56) References Cited

U.S. PATENT DOCUMENTS

| | | | | |
|---|---|---|---|---|
| 7,232,323 | B2 * | 6/2007 | Mohs | H01R 13/193 439/265 |
| 7,670,177 | B2 * | 3/2010 | Myer | H01R 13/4365 439/595 |
| 9,054,454 | B2 * | 6/2015 | Gomez | H01R 13/4538 |
| 10,707,617 | B2 * | 7/2020 | Hirota | H01R 13/5219 |
| 2005/0042921 | A1 | 2/2005 | Nakamura | |
| 2008/0009201 | A1 | 1/2008 | Hiramatsu | |
| 2015/0104963 | A1 | 4/2015 | Saitoh | |
| 2019/0372269 | A1 | 12/2019 | Hirota | |

FOREIGN PATENT DOCUMENTS

JP 2014-165029 A 9/2014

OTHER PUBLICATIONS

International Search Report issued on Oct. 5, 2021 for WO 2022/079978 A1 (4 pages).

* cited by examiner

*Primary Examiner* — Ross N Gushi
(74) *Attorney, Agent, or Firm* — enjuris, P.C.

(57) ABSTRACT

A female connector 20 includes a female housing 21 and a front retainer 50 movable with respect to the male housing in a connecting direction between a partial locking position for allowing resilient deformation of a locking lances 35 of the female housing 21 and a full locking position for suppressing the resilient deformation of the locking lance 35. The female housing 21 includes a stopper portion 42 resiliently deformable in a direction extending in the connecting direction. A male connector 60 includes a contact portion 69 extending in the connecting direction. The front retainer 50 includes a stopper releasing portion 55.

2 Claims, 17 Drawing Sheets

CONNECTOR

CROSS REFERENCE TO RELATED APPLICATIONS

This application is a national phase of PCT application No. PCT/JP2021/028321, filed on 30 Jul. 2021, which claims priority from Japanese patent application No. 2020-173035, filed on 14 Oct. 2020, all of which are incorporated herein by reference.

TECHNICAL FIELD

The present disclosure relates to a connector.

BACKGROUND ART

Conventionally, a connector described in Japanese Unexamined Patent Publication No. 2008-016261 (Patent Document 1 below) is known. The connector described in Patent Document 1 is provided with a housing including a cavity capable of accommodating a terminal fitting and a front retainer, and the front retainer is selectively held at a partial locking position and a full locking position with respect to the housing. When the front retainer is held at the partial locking position, the terminal fitting is allowed to be inserted into and withdrawn from the housing. When the front retainer is held at the full locking position, the withdrawal of the terminal fitting inserted in the housing is suppressed. By pushing a front surface wall of the front retainer in a direction toward the housing, the front retainer can be moved from the partial locking position to the full locking position.

PRIOR ART DOCUMENT

Patent Document

Patent Document 1: JP 2008-016261 A

SUMMARY OF THE INVENTION

Problem to be Solved

In the above configuration, a moving direction of the front retainer from the partial locking position to the full locking position coincides with a connecting direction of the connector. In such a case, even if the front retainer is held at the partial locking position, the connection of the connector and a mating connector, which is a connection partner of the connector, may be allowed.

Means to Solve the Problem

The present disclosure is directed to a connector with a female connector and a male connector to be fit into the female connector, the female connector including a female housing having a receptacle open on one side in a connecting direction, a female terminal to be accommodated into a female terminal accommodating portion inside the female housing and a front retainer movable in the connecting direction between a partial locking position and a full locking position with respect to the male housing, the front retainer allowing resilient deformation of a locking lance provided in the female terminal accommodating portion at the partial locking position, whereby the female terminal is insertable into the female terminal accommodating portion, the front retainer suppressing the resilient deformation of the locking lance at the full locking position, whereby the female terminal is held in the female terminal accommodating portion, the female housing including a stopper portion resiliently deformable in a direction intersecting the connecting direction, the male connector including a contact portion extending in the connecting direction, the contact portion contacting the stopper portion, the front retainer including a stopper releasing portion to be engaged with the stopper portion, a tip part of the contact portion contacting the stopper portion with the front retainer held at the partial locking position, whereby connection of the male connector and the female connector is suppressed, and the stopper releasing portion being engaged with the stopper portion and resiliently deforming the stopper portion with the front retainer held at the full locking position, whereby the stopper portion is arranged not to contact the tip part of the contact portion and the connection of the male connector and the female connector is allowed.

Effect of the Invention

According to the present disclosure, it is possible to provide a connector, the connection of which is suppressed with a front retainer held at a partial locking position.

DETAILED DESCRIPTION TO EXECUTE THE INVENTION

Description of Embodiments of Present Disclosure

Figure 1:
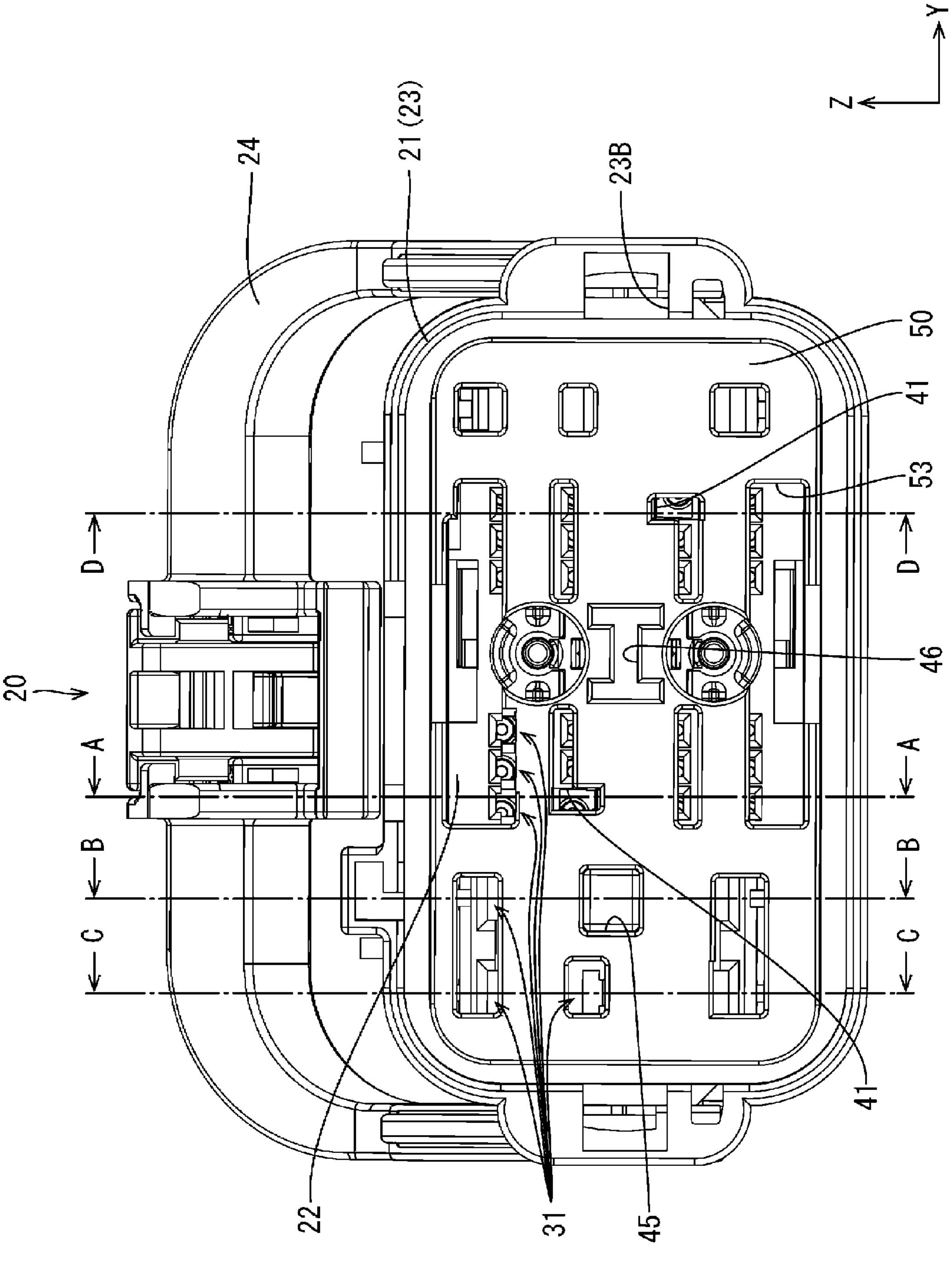
FIG. 1 is a front view of a female connector according to one embodiment.

First, embodiments of the present disclosure are listed and described (1) The connector of the present disclosure is provided with a female connector and a male connector to be fit into the female connector, the female connector including a female housing having a receptacle open on one side in a connecting direction, a female terminal to be accommodated into a female terminal accommodating portion inside the female housing and a front retainer movable in the connecting direction between a partial locking position and a full locking position with respect to the male housing, the front retainer allowing resilient deformation of a locking lance provided in the female terminal accommodating portion at the partial locking position, whereby the female terminal is insertable into the female terminal accommodating portion, the front retainer suppressing the resilient deformation of the locking lance at the full locking position, whereby the female terminal is held in the female terminal accommodating portion, the female housing including a stopper portion resiliently deformable in a direction intersecting the connecting direction, the male connector including a contact portion extending in the connecting direction, the contact portion contacting the stopper portion, the front retainer including a stopper releasing portion to be engaged with the stopper portion, a tip part of the contact portion contacting the stopper portion with the front retainer held at the partial locking position, whereby connection of the male connector and the female connector is suppressed, and the stopper releasing portion being engaged with the stopper portion and resiliently deforming the stopper portion with the front retainer held at the full locking position, whereby the stopper portion is arranged not to contact the tip part of the contact portion and the connection of the male connector and the female connector is allowed.

According to this configuration, the connection of the male connector and the female connector can be suppressed with the front retainer held at the partial locking position.

(2) Preferably, the tip part of the contact portion has a tapered contact surface and is formed into an acute-angled pointed shape, and the stopper portion includes a recess configured to contact the contact surface and receive the tip part of the contact portion with the front retainer held at the partial locking position.

According to this configuration, since a locking force of the contact portion and the stopper portion can be improved with the front retainer held at the partial locking position, the connection of the male connector and the female connector is more easily suppressed.

Details of Embodiment of Present Disclosure

Hereinafter, an embodiment of the present disclosure is described. The present disclosure is not limited to these illustrations, but is represented by claims and intended to include all changes in the scope of claims and in the meaning and scope of equivalents.

Embodiment

The embodiment of the present disclosure is described with reference to FIGS. 1 to 17. A connector 10 of this embodiment is, for example, installed in an automotive vehicle installed with an internal combustion engine such as a gasoline engine or diesel engine or a vehicle such as an electric or hybrid vehicle. In the following description, a direction indicated by an arrow Z is referred to as an upward direction, a direction indicated by an arrow X is referred to as a forward direction, and a direction indicated by an arrow Y is referred to as a leftward direction. Note that, for a plurality of identical members, only some members may be denoted by a reference sign and the other members may not be denoted by the reference sing.

[Connector]

Figure 14:
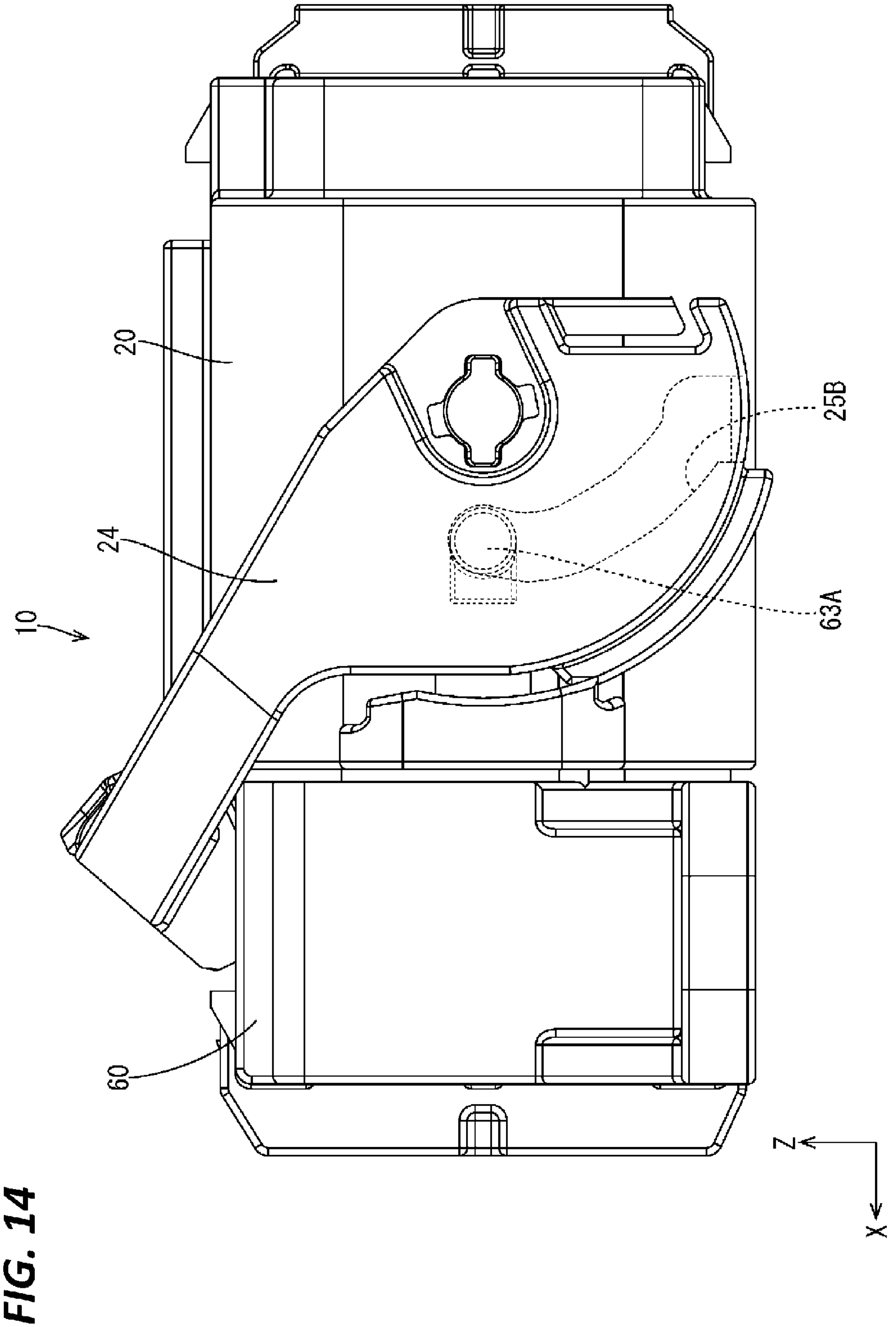
FIG. 14 is a side view of the connector in the connected state of the male and female connectors.

As shown in FIG. 14, the connector 10 is provided with a female connector 20 and a male connector 60 to be fit into the female connector 20. In this embodiment, the connector 10 is a lever-type connector in which a lever 24 is assembled with the female connector 20. By rotating the lever 24, cam pins 63A provided on the male connector 60 are engaged with the inner walls of cam grooves 25B formed in the lever 24, thereby enabling a connecting operation and a separating operation of the connector 10. In this embodiment, a front-rear direction is an example of a connecting direction.

[Female Connector]

As shown in FIG. 1, the female connector 20 is provided with a female housing 21, the lever 24 to be assembled with the female housing 21 and a front retainer 50 held movably in the front-rear direction with respect to the female housing 21.

[Female Housing, Receptacle]

Figure 2:
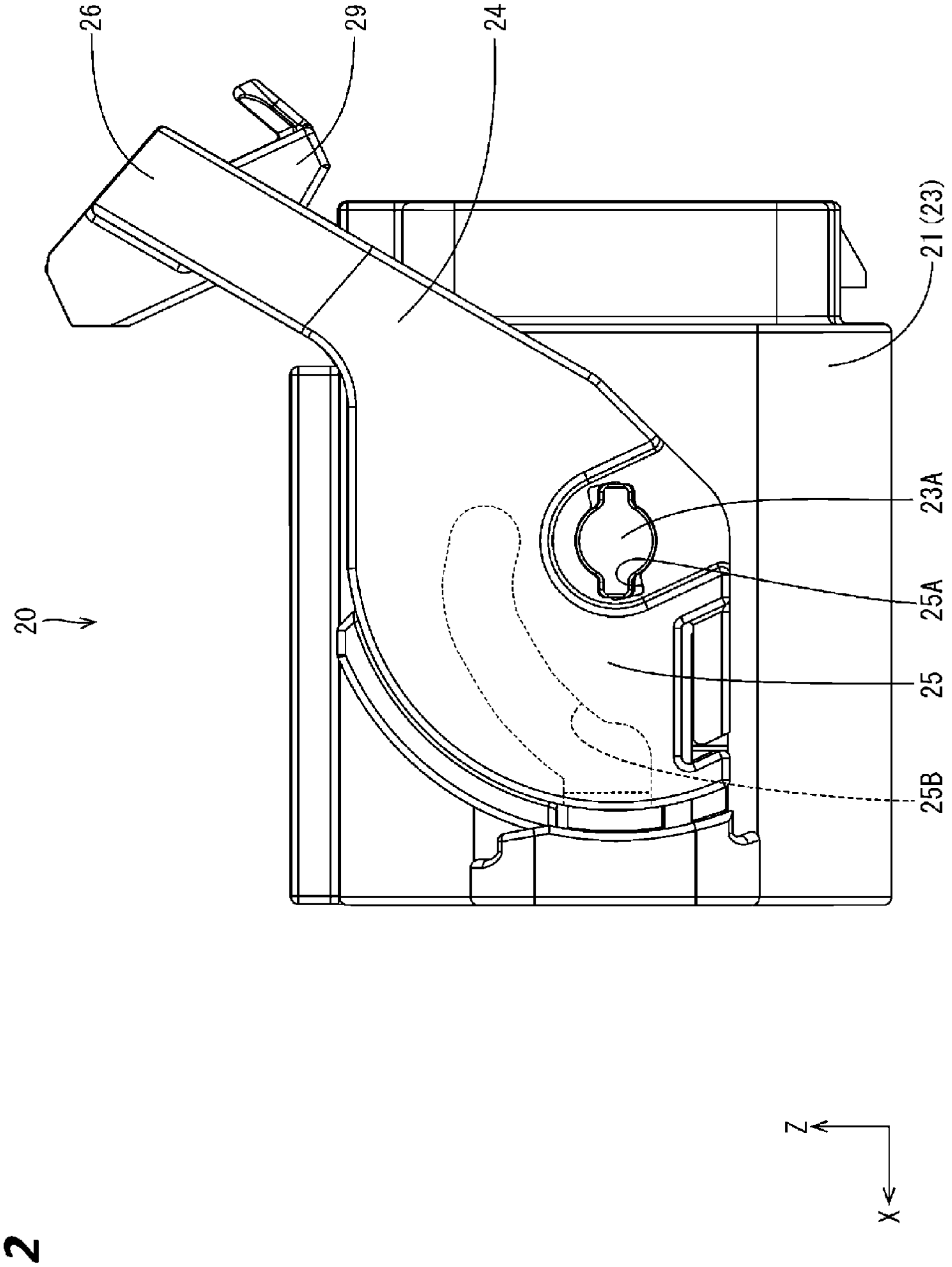
FIG. 2 is a side view of the female connector.
Figure 11:
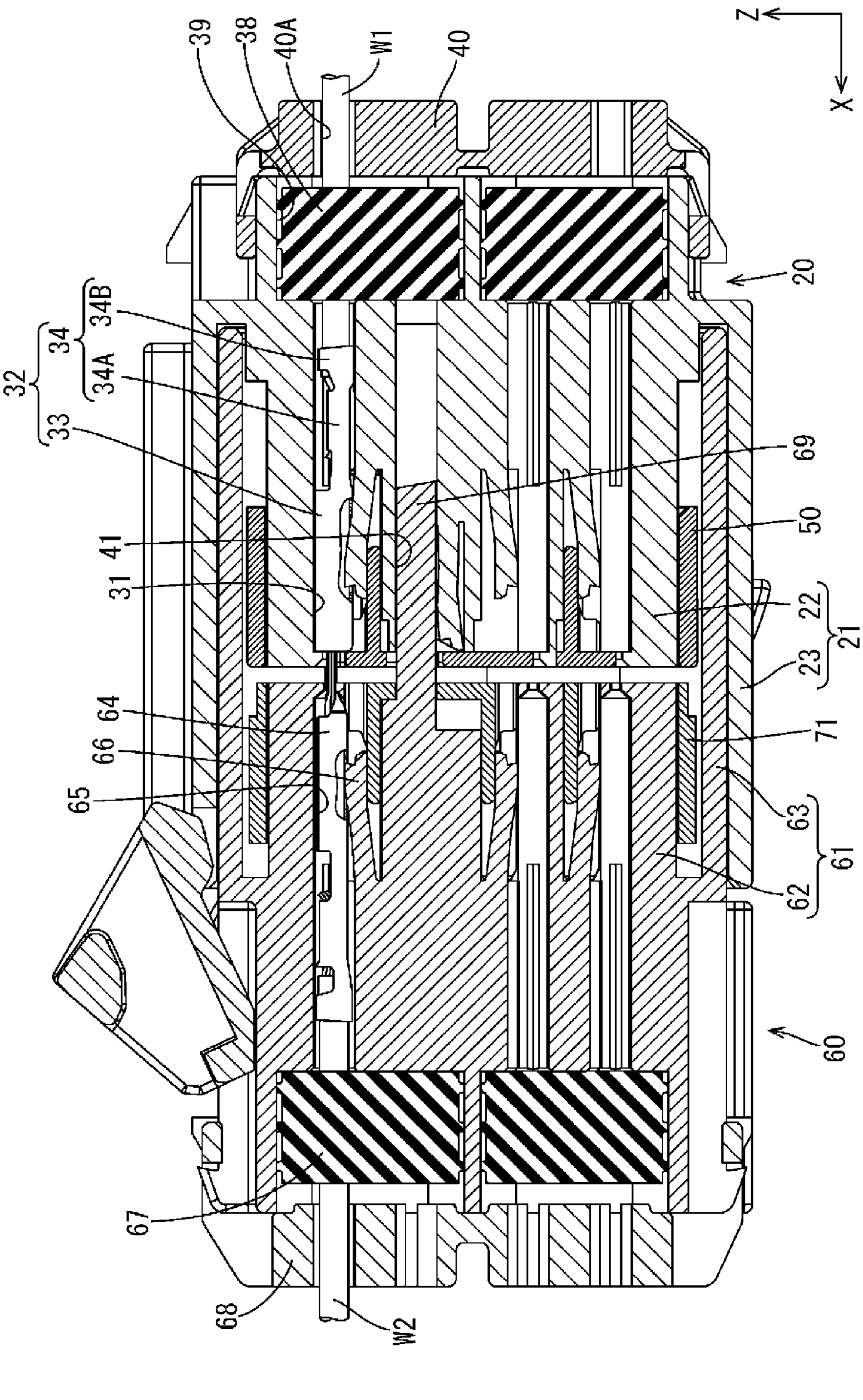
FIG. 11 is a section along A-A of FIG. 1 showing a connected state of a male connector and the female connector.

The female housing 21 is made of insulating synthetic resin and, as shown in FIG. 11, provided with a female housing body 22 and a receptacle 23 covering the outside of the female housing body 22 and open forward. As shown in FIG. 2, rotary shafts 23A projecting outward are provided in central parts of side surfaces of the receptacle 23. As shown in FIG. 1, guide grooves 23B for receiving the cam pins 63A of the male connector 60 are formed on a front side of the receptacle 23.

Figure 16:
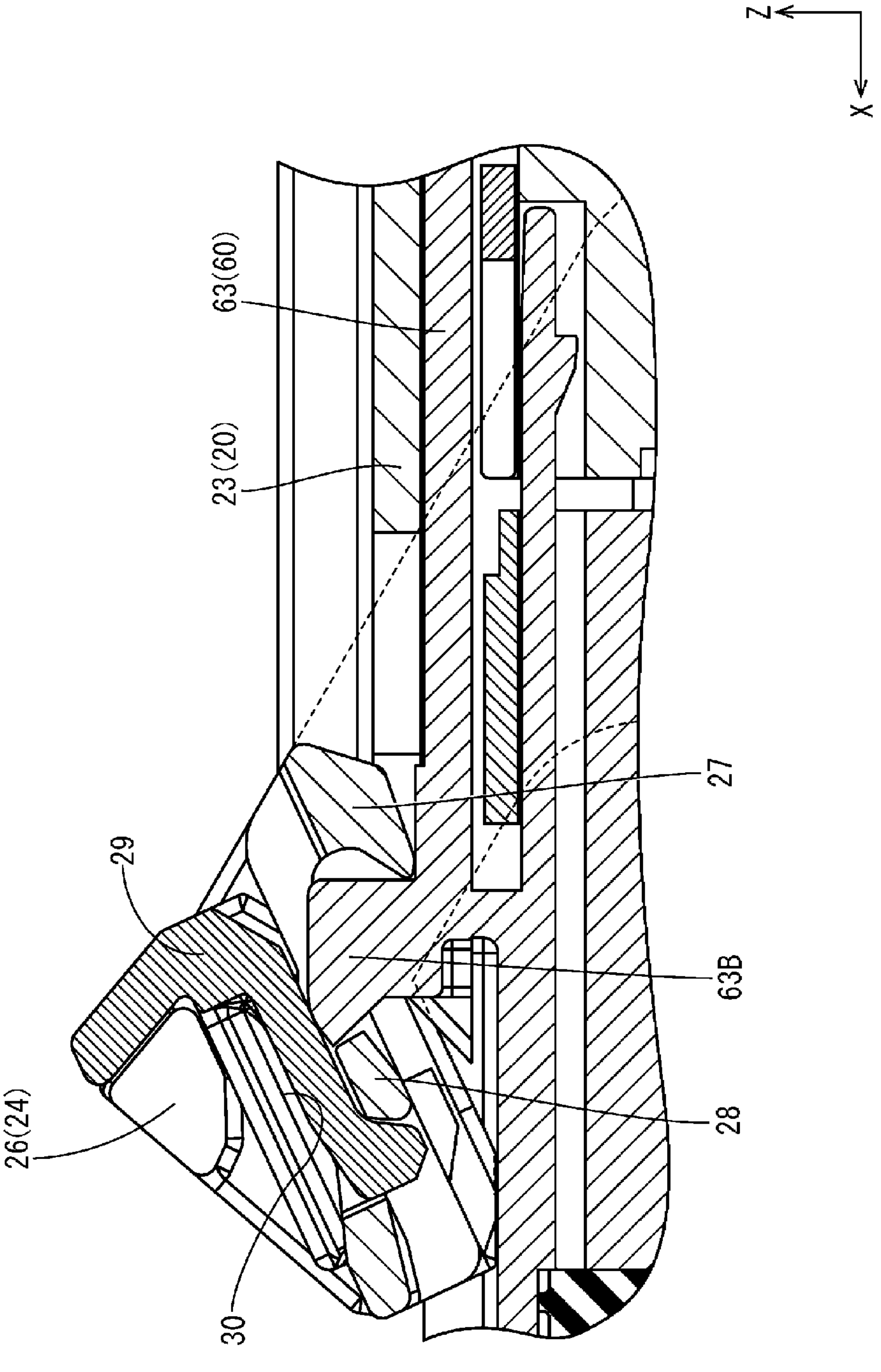
FIG. 16 is an enlarged view in section of the connector at a laterally central position showing the periphery of a connection lock portion in the connected state of the male and female connectors.

The lever 24 is made of insulating synthetic resin and is, as shown in FIG. 2, provided with cam plate portions 25 and a rotating portion 26. The cam plate portion 25 includes a bearing hole 25A for receiving the rotary shaft 23A and the cam groove 25B, into which the cam pin 63A can enter. As shown in FIG. 16, the rotating portion 26 includes a lock arm 27 for holding the lever 24 with the connection of the male connector 60 and the female connector 20 completed, a connection lock receiving portion 28 and a CPA (Connector Position Assurance: connection detecting member) 29. The CPA 29 is separate from the rotating portion 26 and accommodated into a CPA accommodating portion 30 inside the rotating portion 26. By pushing the CPA 29 to a proper position in the CPA accommodating portion 30 with the connection of the male connector 60 and the female connector 20 completed, a connection lock portion 63B of the male connector 60 is locked to the lock arm 27 and the connection lock receiving portion 28 and the lever 60 is fixed not to rotate.

As shown in FIG. 1, the female housing body 22 includes a plurality of female terminal accommodating portions 31, two contact portion accommodating portions 41, a rectangular projection accommodating portion 45 and an H-shaped projection accommodating portion 46. The front retainer 50 includes a plurality of through holes 53 at positions corresponding to the above accommodating portions of the female housing body 22.

[Female Terminal Accommodating Portions, Female Terminals]

As shown in FIG. 11, the female terminal accommodating portion 31 is formed to penetrate through the female housing body 22 in the front-rear direction and accommodates a female terminal 32. The female terminal 32 is made of electrically conductive metal and includes a connecting tube portion 33 in the form of a rectangular tube and a wire crimping portion 34 disposed behind the connecting tube portion 33. A resilient contact piece (not shown) is provided inside the connecting tube portion 33. A male terminal 64 is inserted into the connecting tube portion 33 and brought into contact with the resilient contact piece (not shown), whereby the male terminal 64 and the female terminal 32 are electrically connected. The wire crimping portion 34 includes a core crimping portion 34A to be crimped to a core wire of a wire W1 and a coating crimping portion 34B to be crimped to an insulation coating of the wire W1.

[Locking Lances]

Figure 5:
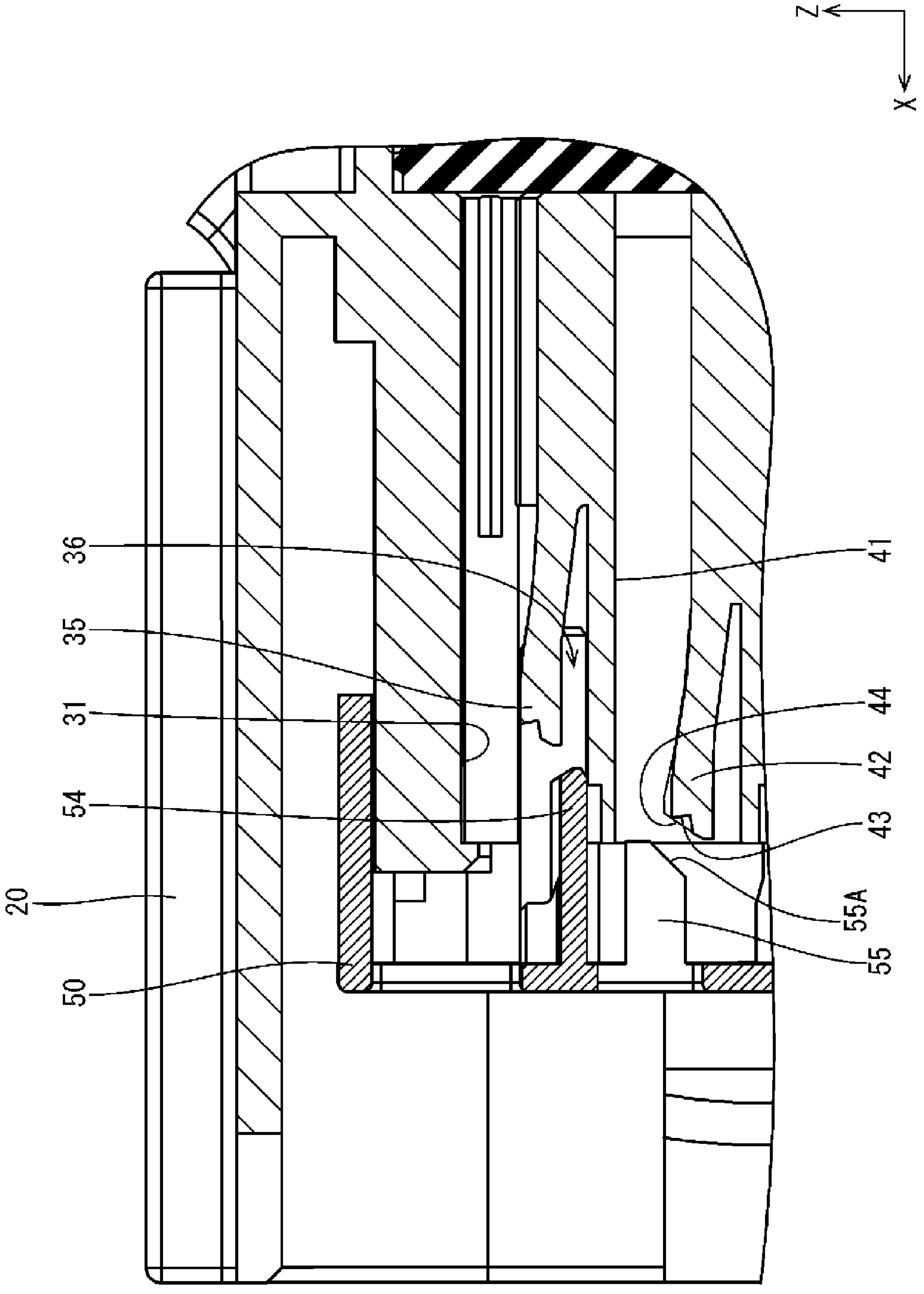
FIG. 5 is an enlarged view in section along A-A of FIG. 1 showing the periphery of a stopper portion with the front retainer held at a partial locking position.
Figure 7:
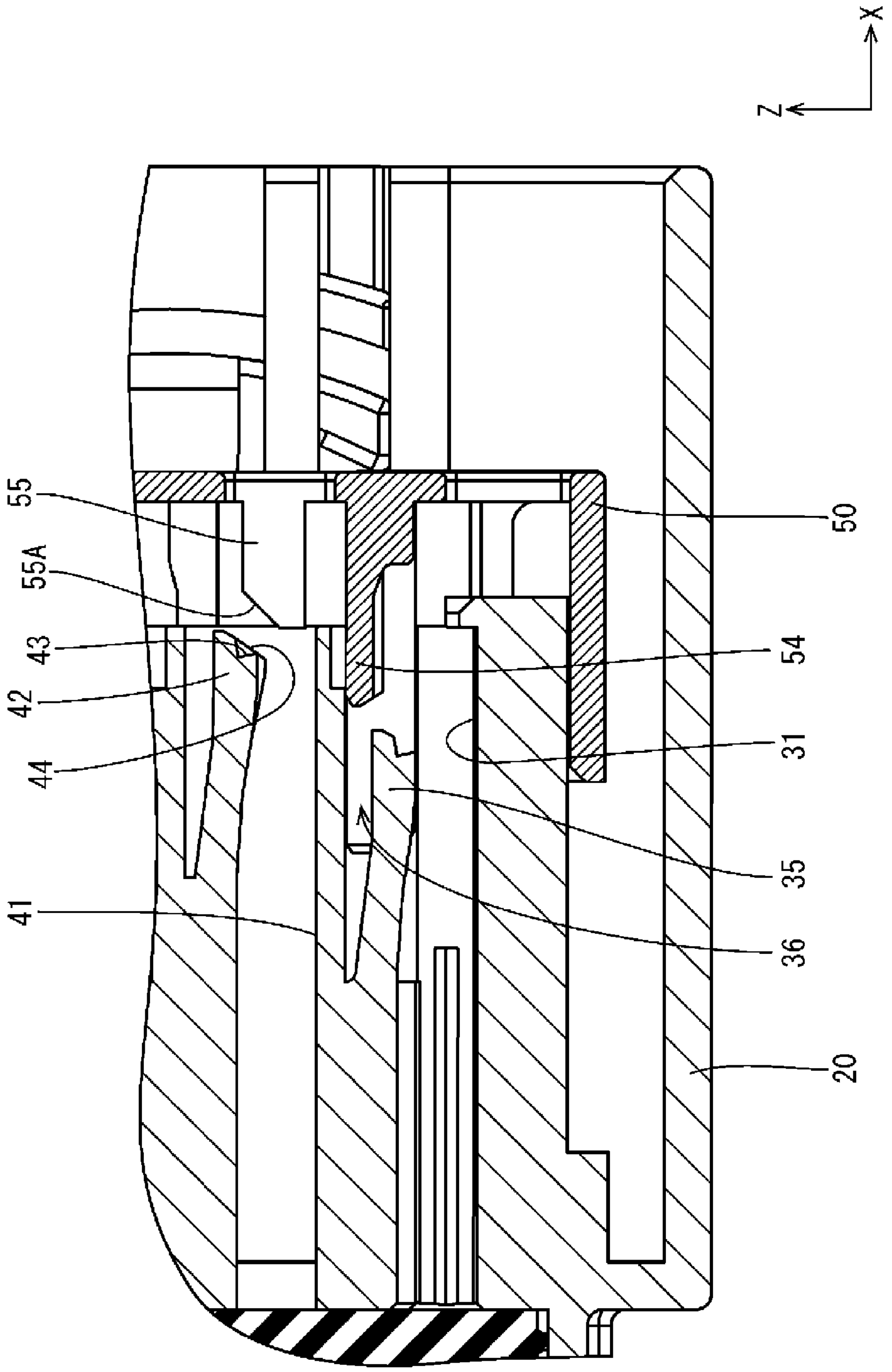
FIG. 7 is an enlarged view in section along D-D of FIG. 1 showing the periphery of the stopper portion with the front retainer held at the partial locking position.
Figure 13:
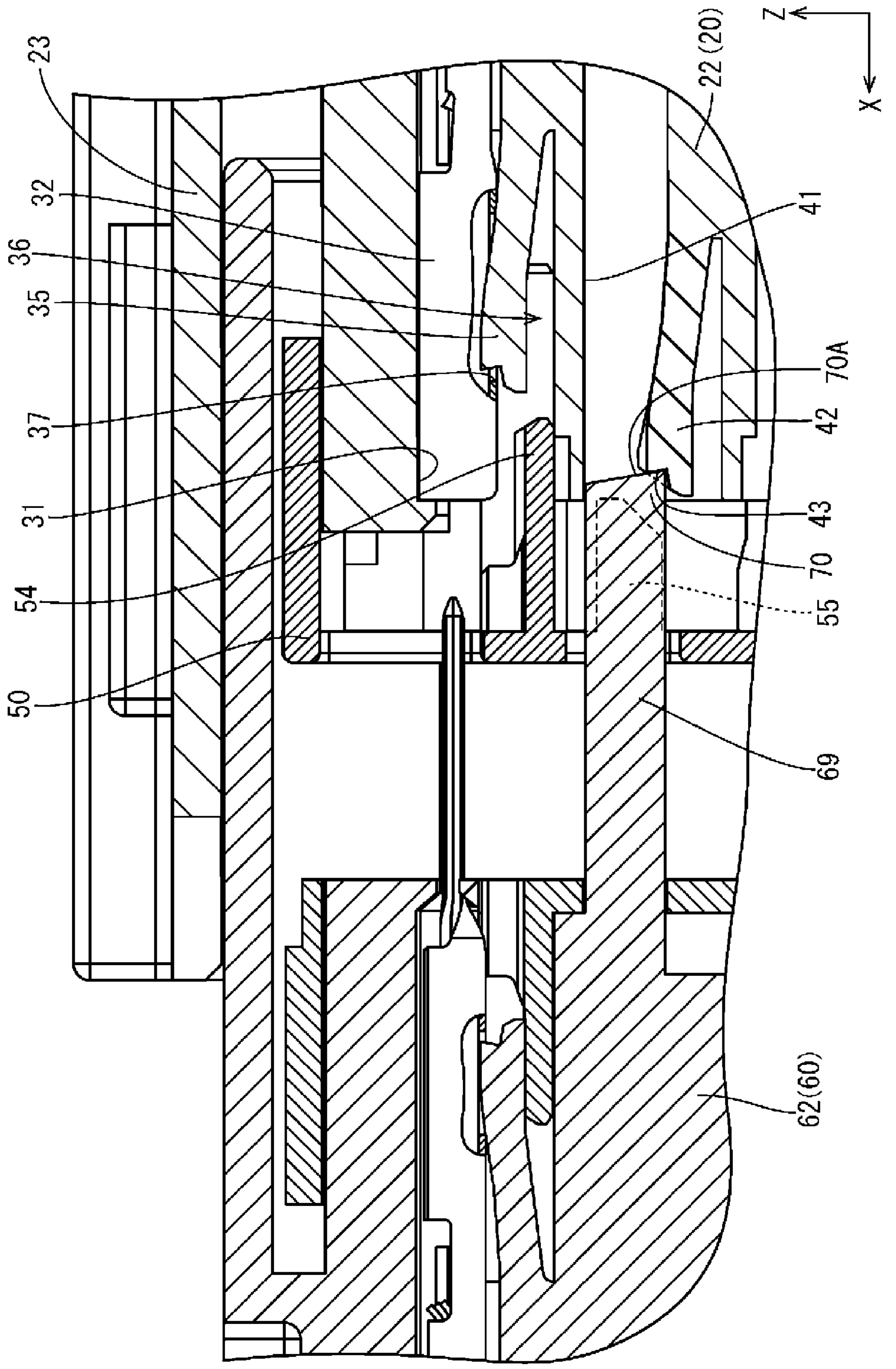
FIG. 13 is an enlarged view in section along A-A of FIG. 1 showing a state where the front retainer is held at the partial locking position and the connection of the male and female connectors is suppressed.

As shown in FIGS. 5 and 7, a lower or upper wall of the female terminal accommodating portion 31 is provided with a locking lance 35 cantilevered forward and a resilient deformation allowing space 36 for allowing the locking lance 35 to be resiliently deformed outwardly (downwardly or upwardly) of the female terminal accommodating portion 31. As shown in FIG. 13, with the female terminal 32 accommodated in the female terminal accommodating portion 31, the locking lance 35 is disposed to lock a locking lance receiving portion 37 provided in the connecting tube portion 33 of the female terminal 32.

As shown in FIG. 11, sealing member accommodating portions 39 for accommodating waterproof sealing members 38 are provided behind the female terminal accommodating portions 31. The sealing member 38 is made of a resilient material such as rubber. The sealing member 38 is formed with sealing insertion holes (not shown), through which the wires W1 are inserted. A lid-like rear holder 40 is mounted on rear parts of the sealing member accommodating portions 39. The rear holder 40 includes insertion holes 40A, through which the wires W are inserted, and closes the sealing member accommodating portions 39 from behind so that the sealing members 38 do not come out from the sealing member accommodating portions 39.

[Stopper Portions, Recesses]

Figure 6:
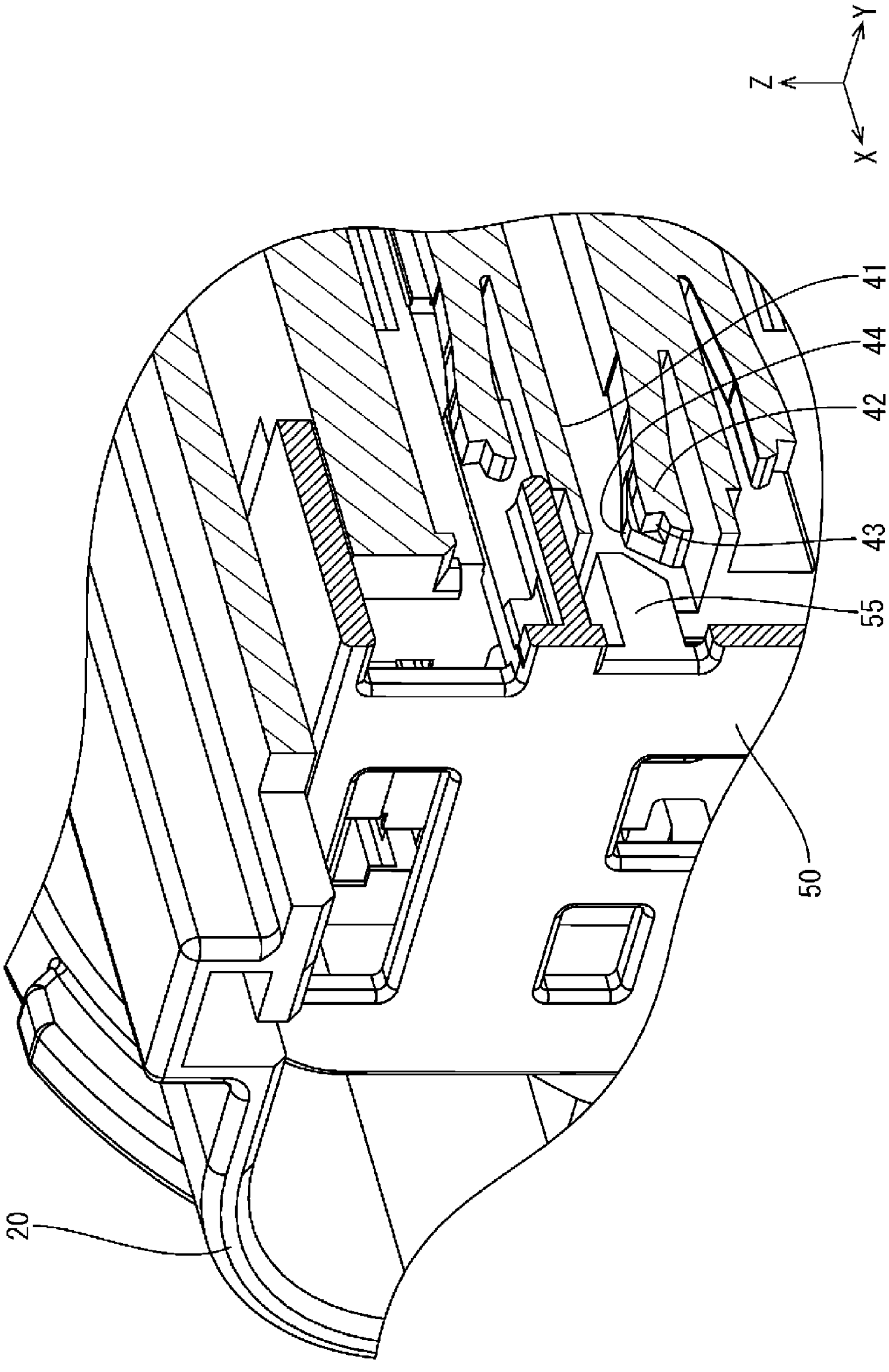
FIG. 6 is a perspective view in section along A-A of FIG. 1 showing the overall shape of the stopper portion.

As shown in FIG. 11, similarly to the female terminal accommodating portion 31, the contact portion accommodating portion 41 is constituted by the inner wall of a hole formed to penetrate through the female housing body 22 in the front-rear direction. A contact portion 69 of the male connector 60 is accommodated into the contact portion accommodating portion 41. The lower wall of the contact portion accommodating portion 41 shown in FIG. 5 is provided with a stopper portion 42 cantilevered forward. The stopper portion 42 is resiliently deformable downward (an example of a direction intersecting the connecting direction). As shown in FIG. 6, a front half of the stopper portion 42 has a shape different on left and right sides. A left part of the stopper portion 42 serves as a recess 43 recessed downward, and a right part of the stopper portion 42 serves as a chevron-shaped engaging portion 44 projecting further upward than the recess 43. The contact portion accommodating portion 41 and the stopper portion 42 shown in FIG. 7 are opposite to the contact portion accommodating portion 41 and the stopper portion 42 shown in FIG. 5 (and FIG. 6) in vertical and lateral directions. That is, the stopper portion 42 shown in FIG. 7 is provided at the upper wall of the contact portion accommodating portion 41 and resiliently deformable upward (an example of the direction intersecting the connecting direction). The right part of the stopper portion 42 shown in FIG. 7 serves as the recess 43 recessed upward, and the left part of the stopper portion 42 serves as the chevron-shaped engaging portion 44 projecting further downward than the recess 43.

[Front Retainer, Stopper Releasing Portions]

Figure 3:
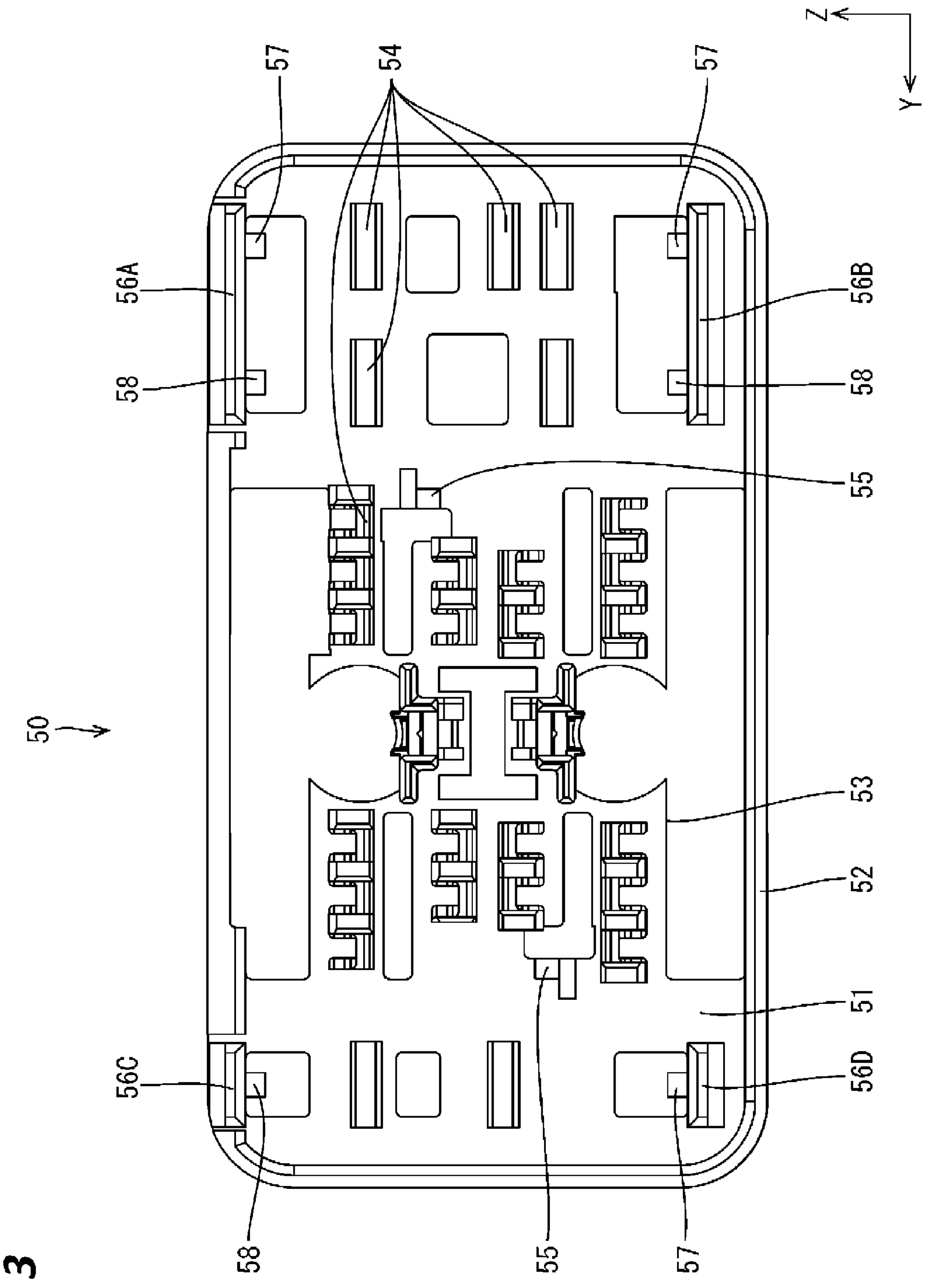
FIG. 3 is a back view of a front retainer.
Figure 4:
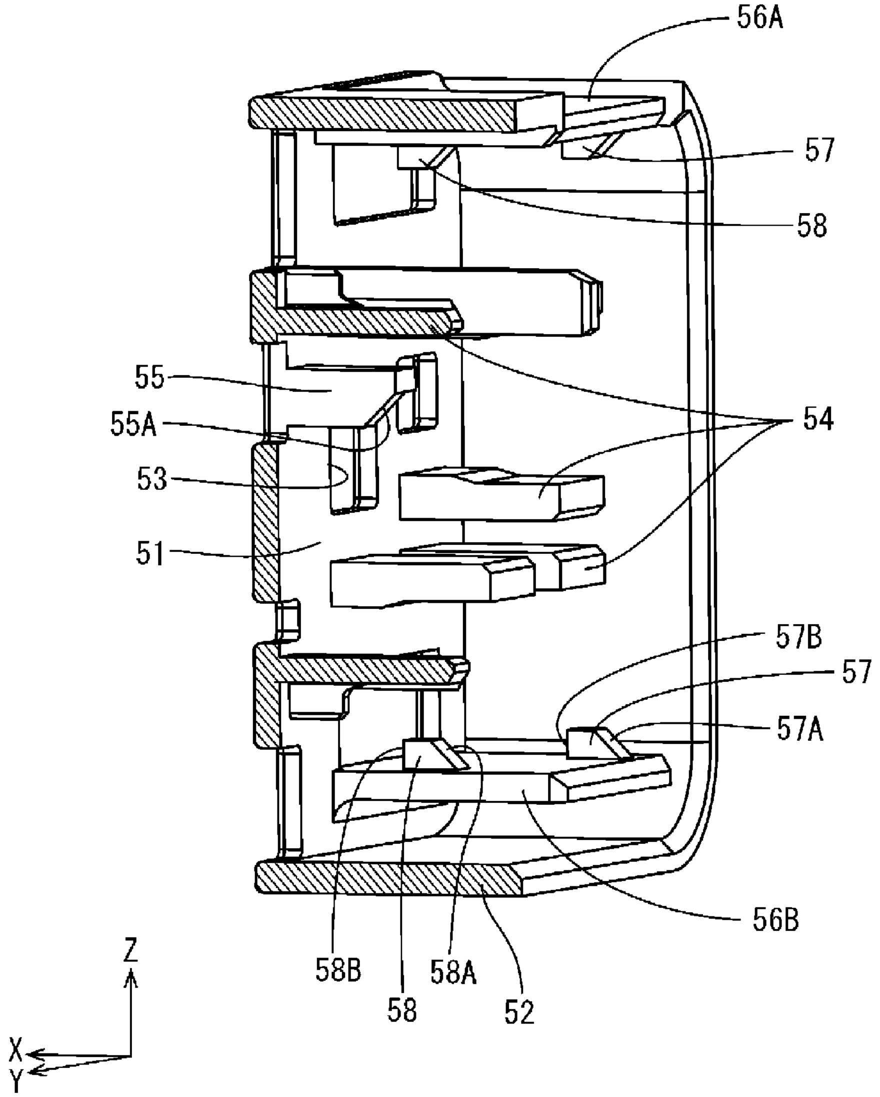
FIG. 4 is a perspective view in section along A-A of FIG. 1 of the front retainer.

The front retainer 50 is made of insulating synthetic resin and includes, as shown in FIGS. 3 and 4, a front wall portion 51, a peripheral wall portion 52 projecting rearward from the outer periphery of the front wall portion 51 and a plurality of through holes 53 formed to penetrate through the front wall portion 51 in the front-rear direction. The front wall portion 51 is formed with a plurality of resilient deformation suppressing portions 54 and two stopper releasing portions 55, both extending rearward. As shown in FIG. 4, an inclined surface 55A is provided on a rear end part of the stopper releasing portion 55.

As shown in FIG. 3, an upper first locking piece 56A and a lower first locking piece 56B are provided in upper and lower parts of a right side of the front wall portion 51. An upper second locking piece 56C and a lower second locking piece 56D are provided in upper and lower parts of a left side of the front wall portion 51. The upper second locking piece 56C and the lower second locking piece 56D have a smaller dimension in the lateral direction than the upper first locking piece 56A and the lower first locking piece 56B. As shown in FIG. 4, each of the upper first locking piece 56A and the lower first locking piece 56B includes a partial locking projection 57 and a full locking projection 58 disposed forward of the partial locking projection 57. Rear parts of the partial locking projection 57 and the full locking projection 58 are tapered and formed into inclined surfaces 57A, 58A located more inward toward the front. Front end surfaces 57B, 58B of the partial locking projection 57 and the full locking projection 58 are surfaces perpendicular to the connecting direction (front-rear direction). Although not shown in detail, the upper second locking piece 56C is formed with a full locking projection 58 and the lower second locking piece 56D is formed with a partial locking projection 57 as shown in FIG. 3.

Figure 8:
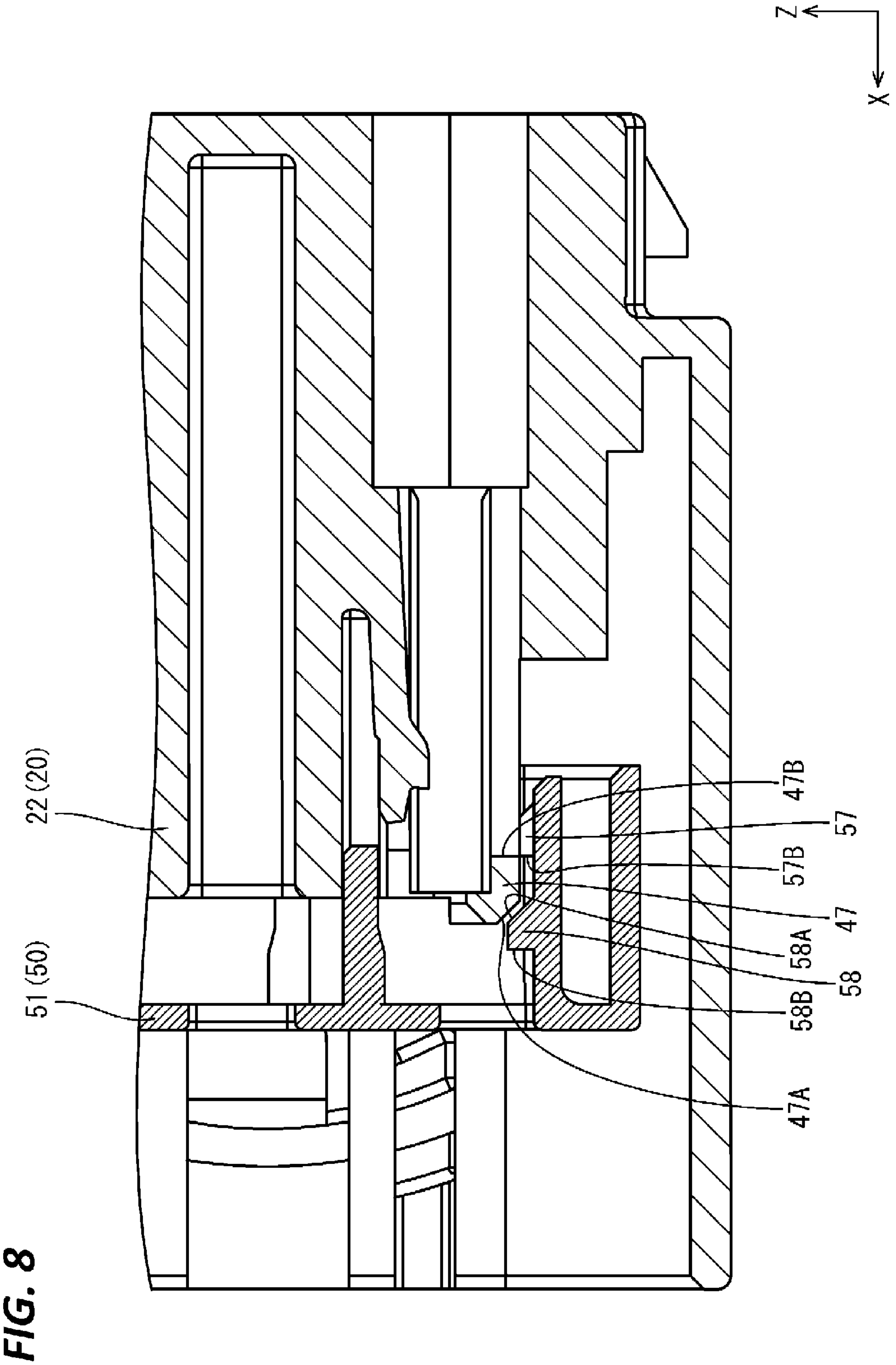
FIG. 8 is an enlarged view in section along B-B of FIG. 1 showing the periphery of a full locking projection with the front retainer held at the partial locking position.
Figure 9:
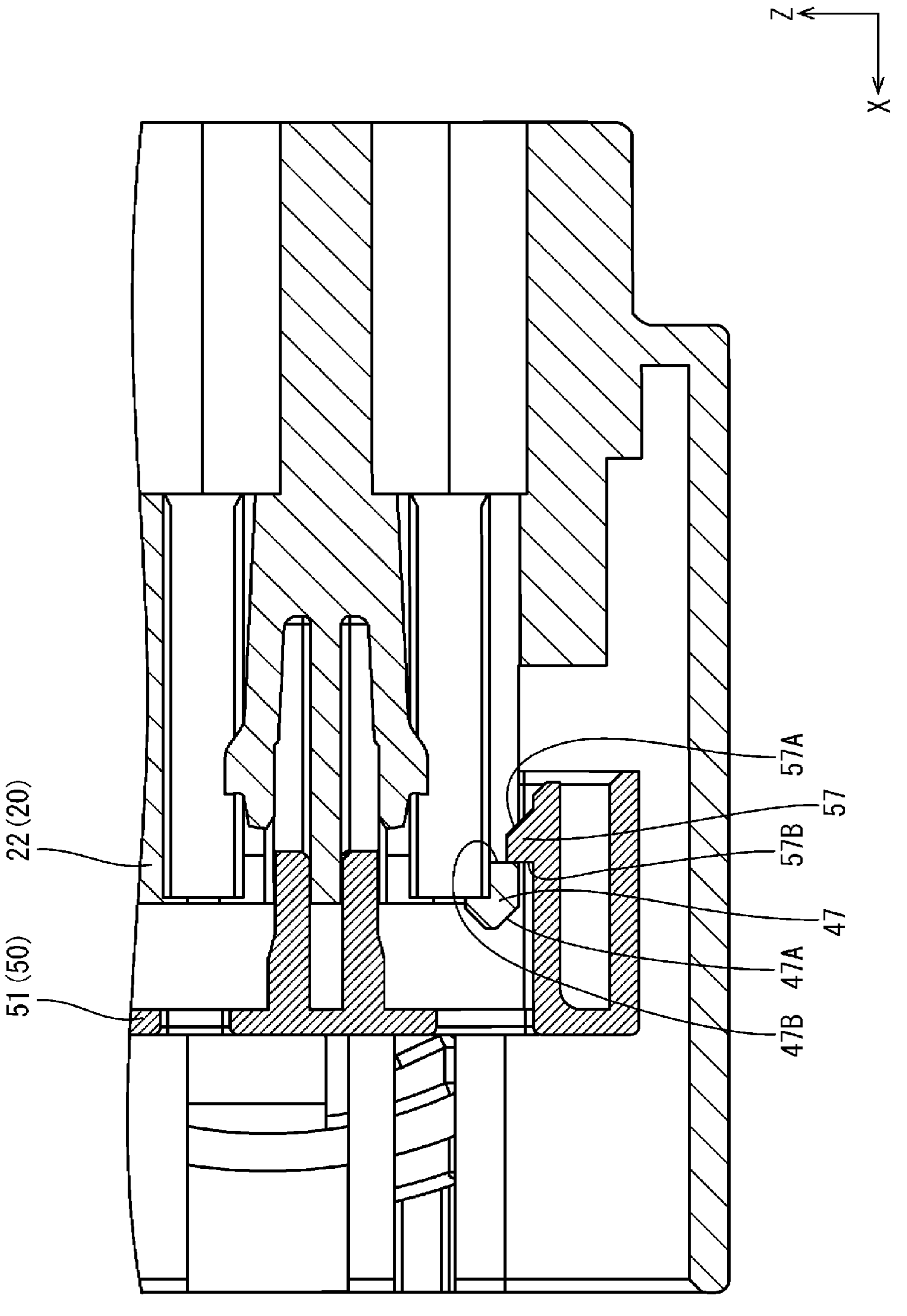
FIG. 9 is an enlarged view in section along C-C of FIG. 1 showing the periphery of a partial locking projection with the front retainer held at the partial locking position.
Figure 10:
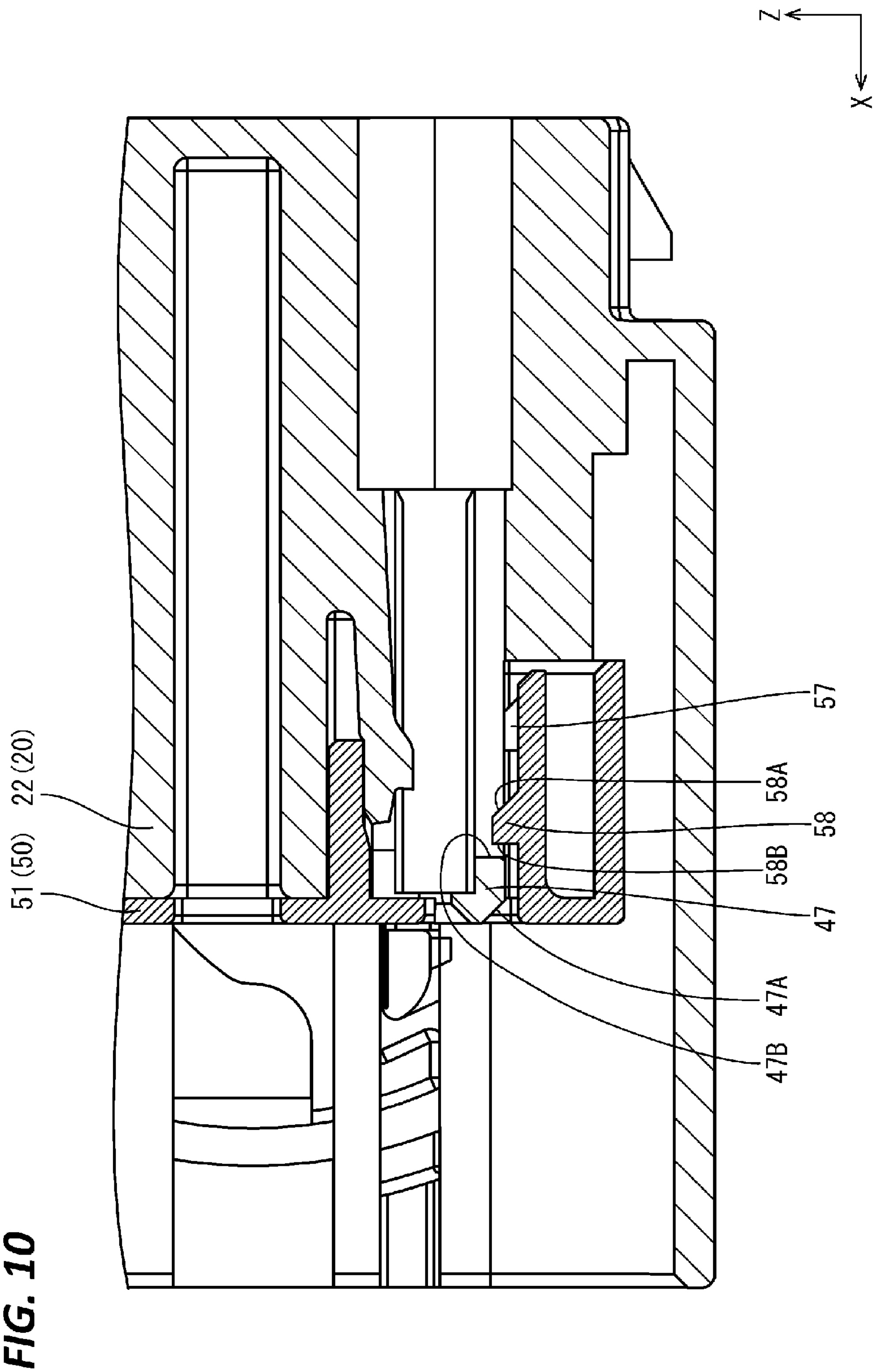
FIG. 10 is an enlarged view in section along B-B of FIG. 1 showing the periphery of the full locking projection with the front retainer held at the partial locking position.

As shown in FIGS. 8 to 10, a locking portion 57 is provided at a position in front of the female housing body 22 and corresponding to the partial locking projection 57 and the full locking projection 58. To simplify description, only the locking portion 47 to be locked by or engaged with the partial locking projection 57 and the full locking projection 58 of the lower first locking piece 56B is described. A locking surface 47B perpendicular to the front-rear direction is provided on the rear end of the locking portion 47. The locking surface 47B is disposed to lock or face the front end surfaces 57B, 58B of the partial locking projection 57 and the full locking projection 58. A front end part of the locking portion 47 is tapered and provided with an inclined surface 57A located more outward (downward in figures) toward the rear. The inclined surface 47A is disposed to be engaged with the inclined surfaces 57A, 58A of the front retainer 50 when the front retainer 50 is mounted on the female housing body 22.

[Partial Locking Position]

If the front retainer 50 is pressed against the female housing body 22, the inclined surface 57A of the partial locking projection 57 and the inclined surface 47A of the locking portion 47 are first engaged (not shown). If the front retainer 50 is further pressed against the female housing body 22, the partial locking projection 57 rides over the locking portion 47 and the inclined surface 58A of the full locking projection 58 and the inclined surface 47A of the locking portion 47 are engaged (see FIG. 8). The position of the front retainer 50 with respect to the female housing body 22 shown in FIGS. 8 and 9 is a partial locking position. When the front retainer 50 is at the partial locking position, the front end surface 57B of the partial locking projection 57 and the locking surface 47B of the locking portion 47 are locked, whereby the front retainer 50 is hardly separated from the female housing body 22 and the front retainer 50 is held at the partial locking position as shown in FIG. 9.

[Full Locking Position]

If the front retainer 50 is further pressed against the female housing body 22 from the partial locking position, the inclined surface 58A of the full locking projection 58 and the inclined surface 47A of the locking portion 47 are engaged and the full locking projection 58 rides over the locking portion 47. The front retainer 50 is pressed against the female housing body 22 until the front wall portion 51 of the front retainer 50 comes into contact with the front surface of the female housing body 22 (see FIG. 10). The position of the front retainer 50 with respect to the female housing body 22 shown in FIG. 10 is a full locking position. When the front retainer 50 is at the full locking position, the front end surface 58B of the full locking projection 58 and the locking surface 47B of the locking portion 47 are facing each other and arranged to be lockable to each other. Thus, the front retainer 50 is hardly separated from the female housing body 22 and the front retainer 50 is held at the full locking position.

Figure 12:
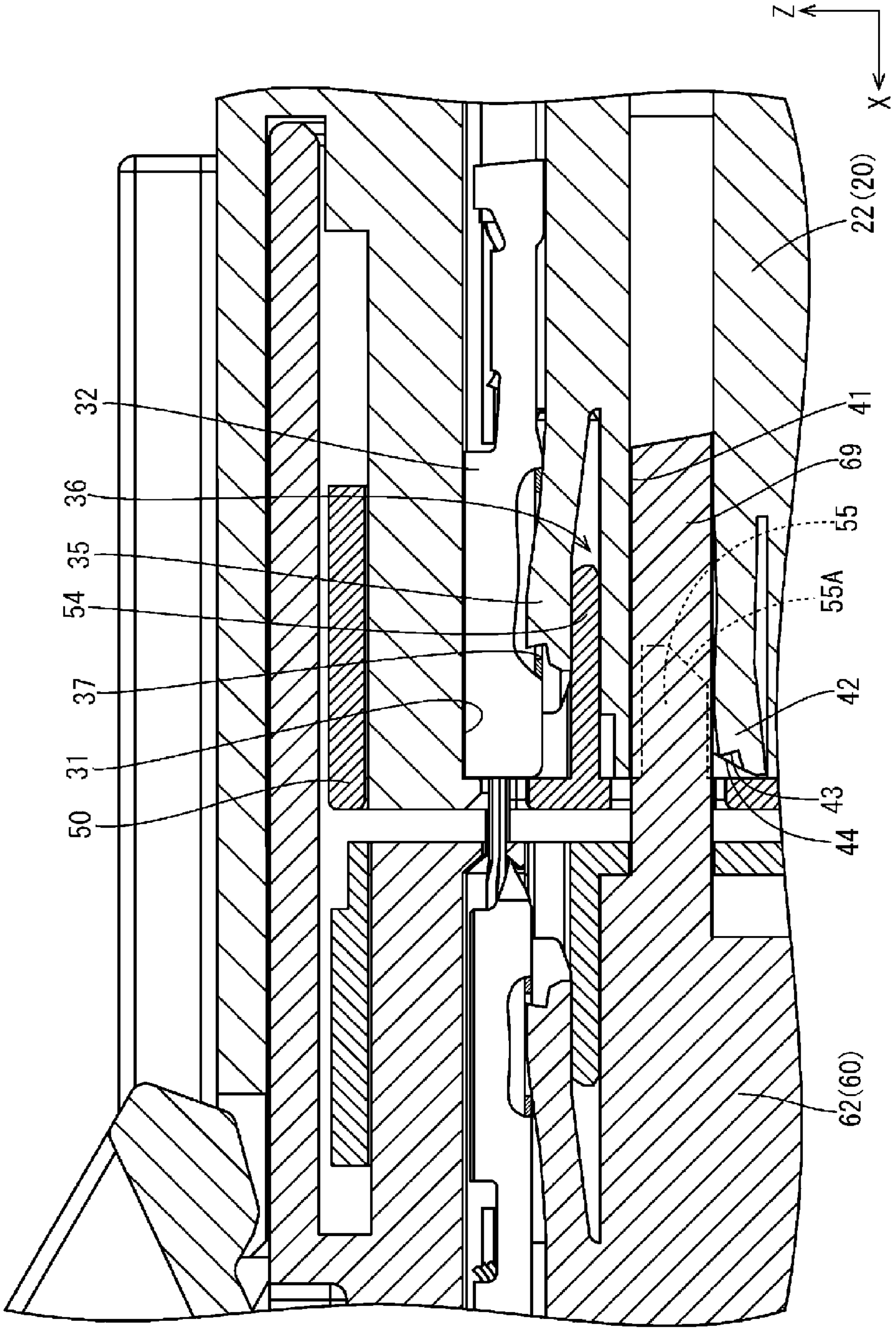
FIG. 12 is an enlarged view of FIG. 1 showing the periphery of a contact portion.

As shown in FIG. 13, the resilient deformation suppressing portion 54 of the front retainer 50 is disposed outside the resilient deformation allowing space 36 of the female terminal accommodating portion 31 with the front retainer 50 held at the partial locking position. Thus, the locking lance 35 is allowed to be resiliently deformed and the female terminal 32 can be inserted into the female terminal accommodating portion 31. As shown in FIG. 12, since the resilient deformation suppressing portion 54 is accommodated in the resilient deformation allowing space 36 with the front retainer 50 held at the full locking position, the resilient deformation of the locking lance 35 is suppressed and the locking of the locking lance 35 and the locking lance receiving portion 37 of the female terminal 32 is not released. Therefore, the female terminal 32 is held in the female terminal accommodating portion 31.

As shown in FIG. 5, the stopper releasing portion 55 of the front retainer 50 is disposed in front of and away from the stopper portion 42 and not engaged with the stopper portion 42 with the front retainer 50 held at the partial locking position. If the front retainer 50 is moved rearward from the partial locking position, the stopper releasing portion 55 starts to be engaged with the engaging portion 44 of the stopper portion 42. Since the rear end part of the stopper releasing portion 55 is formed into the inclined surface 55A, the engagement of the stopper releasing portion 55 and the chevron-shaped engaging portion 44 is smoothly started. If the front retainer 50 is further moved rearward and reaches the full locking position, the stopper releasing portion 55 is engaged with the engaging portion 44 of the stopper portion 42 at a position forward of the inclined surface 55A and resiliently deforms the stopper portion 42 outwardly as shown in FIG. 12. That is, a front part of the contact portion accommodating portion 41 including the stopper portion 42 is widened by the stopper releasing portion 55.

[Male Connector]

Figure 17:
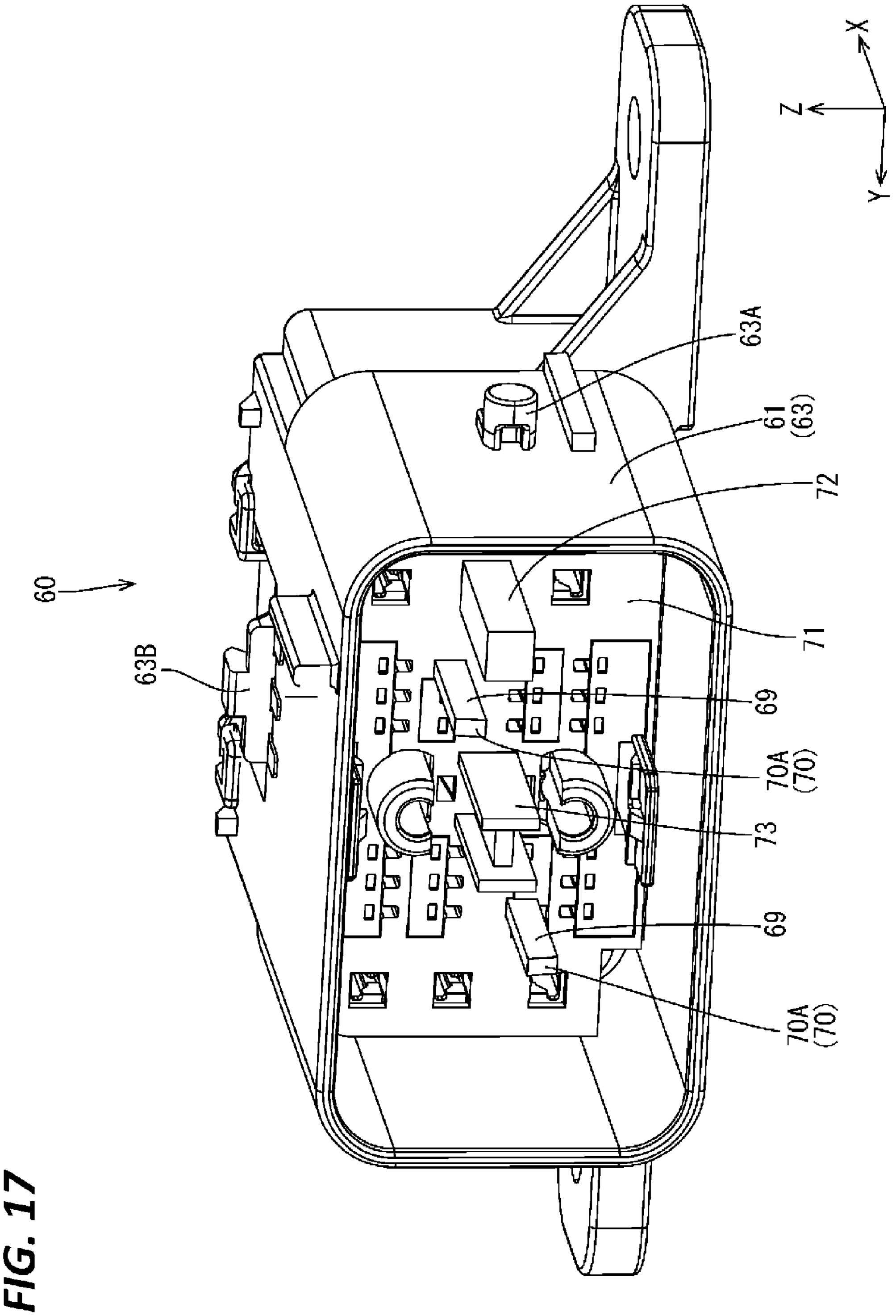
FIG. 17 is a perspective view of the male connector.

As shown in FIG. 17, the male connector 60 is provided with a male housing 61 and a male front retainer 71 held movably in the front-rear direction with respect to the male housing 61.

The male housing 61 is made of insulating synthetic resin and, as shown in FIG. 11, provided with a male housing body 62 and a male receptacle 63 configured to cover the male housing body 62 and open rearward. As shown in FIG. 17, the cam pins 63A are provided to project outward on side surfaces of the male receptacle 63. The connection lock portion 63B is provided on a front end part of the upper wall of the male receptacle 63 and locked to the lock arm 27 and the connection lock receiving portion 28 of the female connector 20 (see FIG. 16).

As shown in FIG. 11, the male housing body 62 includes a plurality of male terminal accommodating portions 65 for accommodating the male terminals 64 connected to wires W2. Although not described in detail, the male front retainer 71 is mounted on the male housing body 62 and disposed at a full locking position, similarly to the female connector 20, whereby the resilient deformation of locking lances 66 is suppressed and the male terminals 64 are held in the male terminal accommodating portions 65. Further, the male connector 60 is provided with sealing members 67, through which the wires W2 are inserted, a rear holder 68 and the like. Only a state where the male front retainer 71 is held at the full locking position is considered below.

[Contact Portions, Tip Parts of Contact Portions, Contact Surfaces]

As shown in FIG. 17, the male housing body 62 includes the contact portions 69 extending rearward and formed into a convex shape. The contact portions 69 are disposed at positions corresponding to the contact portion accommodating portions 41 of the female housing body 22. As shown in FIG. 13, a tip part 70 of the contact portion 69 has a tapered contact surface 70A and is formed into an acute-angled pointed shape. The tip part 70 of the contact portion 69 is in contact with the stopper portion 42 with the front retainer 50 held at the partial locking position.

As shown in FIG. 17, the male front retainer 71 includes a rectangular projection 72 and an H-shaped projection 73 projecting rearward. The rectangular projection 72 and the H-shaped projection 73 are respectively accommodated into the rectangular projection accommodating portion 45 and the H-shaped projection accommodating portion 46 of the female housing body 22 (see FIG. 1). By providing the rectangular projection 72 and the H-shaped projection 73, the connector 10 is prevented from being twisted.

[Connection of Connector with Front Retainer Held at Partial Locking Position]

Figure 15:
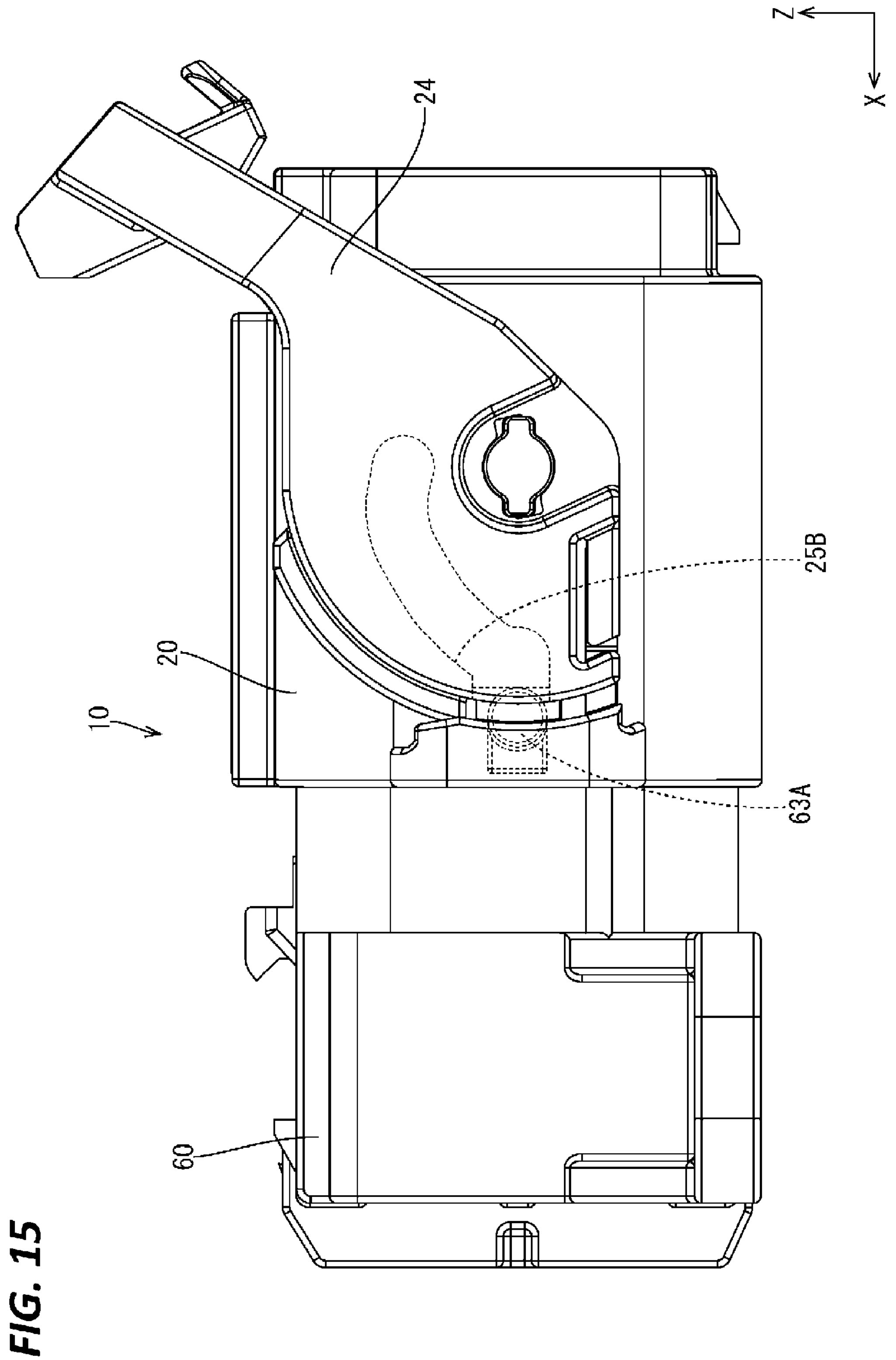
FIG. 15 is a side view of the connector in the state where the front retainer is held at the partial locking position and the connection of the male and female connectors is suppressed.

As shown in FIG. 13, if the male connector 60 is inserted into the receptacle 23 of the female connector 20 with the front retainer 50 of the female connector 20 held at the partial locking position, the recesses 43 of the stopper portions 42 come into contact with the contact surfaces 70A and receive the tip parts 70 of the contact portions 69. Accordingly, the male connector 60 cannot be further inserted into the receptacle 23, wherefore the connection of the male connector 60 and the female connector 20 can be suppressed. Further, the cam pins 63A are arranged not to completely enter the cam grooves 25B of the lever 24 as shown in FIG. 15 with the recesses 43 and the tip parts 70 of the contact portions 69 locked. As a result, the connector 10 is prevented from being forcibly connected by rotating the lever 24.

[Connection of Connector with Front Retainer Held at Full Locking Position]

On the other hand, with the front retainer 50 held at the full locking position, the stopper releasing portions 55 are engaged with the stopper portions 42 and the stopper portions 42 are resiliently deformed as shown in FIG. 12. In this way, the stopper portions 42 are arranged not to contact the tip parts 70 of the contact portions 69 and the contact portions 69 can be accommodated into the contact portion accommodating portions 41. Therefore, the male connector 60 and the female connector 20 can be properly connected (see FIG. 11).

[Functions and Effects of Embodiment]

According to this embodiment, the following functions and effects are achieved.

The connector 10 according to this embodiment is provided with the female connector 20 and the male connector 60 to be fit into the female connector 20. The female connector 20 includes the female housing 21 having the receptacle 23 open forward, the female terminals 32 to be accommodated into the female terminal accommodating portions 31 inside the female housing 21 and the front retainer 50 movable in the front-rear direction between the partial locking position and the full locking position with respect to the female housing 21. At the partial locking position, the front retainer 50 allows the resilient deformation of the locking lances 35 provided in the female terminal accommodating portions 31, whereby the female terminals 32 are held in the female terminal accommodating portions 31. At the full locking position, the front retainer 50 suppresses the resilient deformation of the locking lances 35, whereby the female terminals 32 are held in the female terminal accommodating portions 31. The female housing 21 includes the stopper portions 42 resiliently deformable in the vertical direction. The male connector 60 includes the contact portions 69 extending in the front-rear direction and configured to contact the stopper portions 42. The front retainer 50 includes the stopper releasing portions 55 to be engaged with the stopper portions 42. With the front retainer 50 held at the partial locking position, the tip parts 70 of the contact portions 69 are in contact with the stopper portions 42, whereby the connection of the male connector 60 and the female connector 20 is suppressed. With the front retainer 50 held at the full locking position, the stopper releasing portions 55 are engaged with the stopper portions 42 and resiliently deform the stopper portions 42, whereby the stopper portions 42 are arranged not to contact the tip parts 70 of the contact portions 69 and the connection of the male connector 60 and the female connector 20 is allowed.

According to the above configuration, the connection of the male connector 60 and the female connector 20 can be suppressed with the front retainer 50 held at the partial locking position.

In this embodiment, the tip part 70 of the contact portion 69 has the tapered contact surface 70A and is formed into an acute-angled pointed shape, and the stopper portion 42 includes the recess 43 in contact with the contact surface 70A for receiving the tip part 70 of the contact portion 69 with the front retainer 50 held at the partial locking position.

According to the above configuration, since a locking force of the contact portion 69 and the stopper portion 42 can be improved with the front retainer 50 held at the partial locking position, the connection of the male connector 60 and the female connector 20 is more easily suppressed.

Other Embodiments (1) Although the contact portion 69 is provided in the male housing body 62 in the above embodiment, there is no limitation to this. A contact portion may be provided in a male front retainer.

(2) Although the male connector 60 includes the male front retainer 71 in the above embodiment, there is no limitation to this. For example, a male connector may include no male front retainer and male terminals may be held in the male connector by being press-fit.

(3) Although the connector 10 includes the lever 24 in the above embodiment, there is no limitation to this. A connector may include no lever.

(4) Although the connector 10 includes the sealing members 38 and the rear holder 40 in the above embodiment, there is no limitation to this. A connector may include neither sealing members nor a rear holder.

LIST OF REFERENCE NUMERALS

10: connector
20: male connector
21: female housing
22: female housing body
23: receptacle
23A: rotary shaft
23B: guide groove
24: lever
25: cam plate portion
25A: bearing hole
25B: cam groove
26: rotating portion
27: lock arm
28: connection lock receiving portion
29: CPA
30: CPA accommodating portion
31: female terminal accommodating portion
32: female terminal
33: connecting tube portion
34: wire crimping portion
34A: core crimping portion
34B: coating crimping portion
35, 66: locking lance
36: resilient deformation allowing space
37: lance receiving portion
38, 67: sealing member
39: sealing member accommodating portion
40, 68: rear holder
40A: insertion hole
41: contact portion accommodating portion
42: stopper portion
43: recess
44: engaging portion
45: rectangular projection accommodating portion
46: H-shaped projection accommodating portion
47: locking portion
47A: inclined surface of locking portion
47B: locking surface
50: front retainer
51: front wall portion
52: peripheral wall portion
53: through hole
54: resilient deformation suppressing portion
55: stopper releasing portion
55A: inclined surface of stopper releasing portion
56A: upper first locking piece

56B: lower first locking piece
56C: upper second locking piece
56D: lower second locking piece
57: partial locking projection
57A: inclined surface of partial locking projection
57: front end surface of partial locking projection
58: full locking projection
58A: inclined surface of full locking projection
58B: front end surface of full locking projection
60: male connector
61: male housing
62: male housing body
63: male receptacle
63A: cam pin
63B: connection lock portion
64: male terminal
65: male terminal accommodating portion
69: contact portion
70: tip part
70A: contact surface
71: male front retainer
72: rectangular projection
73: H-shaped projection
W1, W2: wire

What is claimed is:

1. A connector, comprising:

a female connector; and a male connector to be fit into the female connector, the female connector including a female housing having a receptacle open on one side in a connecting direction, a female terminal to be accommodated into a female terminal accommodating portion inside the female housing and a front retainer movable in the connecting direction between a partial locking position and a full locking position with respect to the male housing, the front retainer allowing resilient deformation of a locking lance provided in the female terminal accommodating portion at the partial locking position, whereby the female terminal is insertable into the female terminal accommodating portion, the front retainer suppressing the resilient deformation of the locking lance at the full locking position, whereby the female terminal is held in the female terminal accommodating portion, the female housing including a stopper portion resiliently deformable in a direction intersecting the connecting direction, the male connector including a contact portion extending in the connecting direction, the contact portion contacting the stopper portion, the front retainer including a stopper releasing portion to be engaged with the stopper portion, a tip part of the contact portion contacting the stopper portion with the front retainer held at the partial locking position, whereby connection of the male connector and the female connector is suppressed, and the stopper releasing portion being engaged with the stopper portion and resiliently deforming the stopper portion with the front retainer held at the full locking position, whereby the stopper portion is arranged not to contact the tip part of the contact portion and the connection of the male connector and the female connector is allowed.

2. The connector of claim 1, wherein:

the tip part of the contact portion has a tapered contact surface and is formed into an acute-angled pointed shape, and the stopper portion includes a recess configured to contact the contact surface and receive the tip part of the contact portion with the front retainer held at the partial locking position.

* * * * *